(12) United States Patent
Richard (10) Patent No.: US 7,716,831 B2
(45) Date of Patent: May 18, 2010

(54) METHOD OF ASSEMBLING AN ACTUATOR WITH AN INTERNAL SENSOR

(75) Inventor: Glasson O Richard, Whippany, NJ (US)

(73) Assignee: Control Products, Inc., East Hanover, NJ (US)

( * ) Notice: Subject to any disclaimer, the term of this patent is extended or adjusted under 35 U.S.C. 154(b) by 601 days.

(21) Appl. No.: 11/455,407

(22) Filed: Jun. 19, 2006

(65) Prior Publication Data

US 2006/0236539 A1 Oct. 26, 2006

Related U.S. Application Data

(62) Division of application No. 10/098,933, filed on Mar. 15, 2002, now Pat. No. 7,093,361.

(60) Provisional application No. 60/351,007, filed on Jan. 23, 2002, provisional application No. 60/364,711, filed on Mar. 15, 2002.

(51) Int. Cl.
*B21D 51/16* (2006.01)
*B23P 17/00* (2006.01)

(52) U.S. Cl. .................. 29/890.09; 29/832; 29/834; 92/258

(58) Field of Classification Search ............ 29/33 T, 29/235, 236, 418, 434, 450–454, 593–595, 29/609.1, 739, 832, 854, 890.06, 890.09; 33/600, 605; 91/361; 92/5 R, 216, 218, 92/255, 258; 73/168, 816; 324/635, 691
See application file for complete search history.

(56) References Cited

U.S. PATENT DOCUMENTS

| 4,121,504 | A | * | 10/1978 | Nowak | 92/5 R |
| 4,610,834 | A | * | 9/1986 | Baron et al. | 29/453 |
| 6,209,183 | B1 | * | 4/2001 | Bugosh | 29/280 |
| 6,253,460 | B1 | | 7/2001 | Schmitz | |
| 6,450,048 | B1 | * | 9/2002 | Samuelson et al. | 73/168 |
| 6,588,313 | B2 | | 7/2003 | Brown et al. | |

FOREIGN PATENT DOCUMENTS

DE 20015895 1/2001

* cited by examiner

*Primary Examiner*—Donghai D. Nguyen (57) ABSTRACT

A method of installing a piston position sensor proximate to a closed end of a hydraulic cylinder is provided. The sensor is attached to the face of a piston and that piston/sensor combination is inserted into the cylinder tube to position the sensor in the desired location. When properly located within the cylinder tube, the sensor is affixed to the cylinder tube by means of beveled holes in the sensor that receive bolts threadedly inserted through the cylinder tube to further properly align the sensor within the cylinder tube. When so affixed, the sensor is then detached from the piston so that the piston can thereafter move independently of the sensor. A fixture is also used that allows the assembler to accurately align the angular orientation of the sensor prior to being inserted into the cylinder tube.

18 Claims, 6 Drawing Sheets

METHOD OF ASSEMBLING AN ACTUATOR WITH AN INTERNAL SENSOR

CROSS REFERENCES

This application is a divisional of application Ser. No. 10/098,933, filed on Mar. 15, 2002, now U.S. Pat. No. 7,093,361, entitled "METHOD OF ASSEMBLING AN ACTUATOR WITH AN INTERNAL SENSOR" which is related to U.S. Pat. No. 6,234,061 entitled "Precision Sensor for a Hydraulic Cylinder," and U.S. patent applications, Ser. No. 09/793,218 filed Feb. 26, 2001 entitled "Precision Sensor for a Hydraulic Cylinder," U.S. Ser. No. 09/785,097 filed Feb. 16, 2001, now U.S. Pat. No. 6,411,082, entitled "Multi-Turn, Non-contacting Rotary Shaft Position Sensor," U.S. Provisional Patent Application Ser. No. 60/351,007 filed Jan. 23, 2002 entitled "An Improved Lead Guide for Cable Extension Type Position Sensors," and U.S. Provisional Patent Application Ser. No. 60/364,711 filed Mar. 15, 2002 entitled "Method and Apparatus for Connecting Cables" filed concurrently, having the same inventor and assignee as the present application. Each of the above referenced applications is incorporated herein by reference.

FIELD OF THE INVENTION

The invention generally relates to actuators having an internal moving member and an internal sensor for sensing the position of the moving member relative to a fixed reference.

BACKGROUND

Actuators are in wide spread use to actuate other implements or devices. The applications of actuators are virtually limitless and the size, shape, etc. of the actuator as well as the device actuated is relatively unconstrained. Hydraulic cylinders are one commonly used form of actuators. Such actuators include a cylinder and an internal piston which actuates an external device. In many actuator applications, there is a need for greater control of the movement of the device imparted by the actuator. One example of this need is in the equipment arena where hydraulic cylinders are used as actuators to control the movement of a mechanical device, such as the bucket or claw on construction equipment.

There are, in use today, various types of piston position sensors that are used to accurately sense the position of a piston within a hydraulic cylinder. The operation of such hydraulic cylinders, therefore, depends upon a position sensor to automatically and accurately determine the location of a piston with the hydraulic cylinder, and correspondingly, the position of the particular implement that is being controlled by that hydraulic cylinder. One of such sensors and its use and construction is shown and described in U.S. Pat. No. 6,234,061 entitled "Precision Sensor for a Hydraulic Cylinder," and the disclosures of which is hereby incorporated by reference. That particular sensor is, therefore, one that is positioned within the interior of the hydraulic cylinder proximate the closed end of the cylinder, that is, the end opposite the working end where the piston rod extends to be affixed to the equipment to be moved.

In the construction and assembly of hydraulic cylinders, the manufacture of such hydraulic cylinders is an established, well-defined process. It is desirable not to disrupt that process by adding some additional complexity to the manufacturing techniques, that is, the less changes that are required in the current manufacturing practices, the better the acceptance of the sensor.

In the normal manufacturing practices of assembling a hydraulic cylinder, the final assembly consists of bringing together two major subassemblies, the "tube assembly" and the "piston rod" assembly. The tube assembly consists mainly of the cylinder tube with the back cap attached thereto and the other end is open to receive the piston rod assembly. The piston rod assembly, on the other hand, consists of the piston rod, the head and the piston. As such, in the final assembly, the piston rod assembly is inserted into the tube assembly similar to loading a cannon such that the piston is inserted into the open end of the cylinder tube and is pushed all the way back to the closed end of the cylinder tube. When so inserted the head is positioned at the open end of the cylinder tube and secured thereto, either by means of a threaded connection by threads formed internal of the cylinder tube and threads formed external to the head, or by means of bolts that are threaded into a mating flange welded to the open end of the cylinder tube. In either case, once the head has been secured to the open end of the cylinder tube, the cylinder assembly is complete.

Accordingly, it would be advantageous to provide a system or procedural steps in the manufacture of a hydraulic cylinder to be able to install a sensor in the closed end of a cylinder tube, and secure the sensor at that location while minimizing disruptions and changes to current manufacturing practices for the construction and assembly of such hydraulic cylinders.

SUMMARY OF THE INVENTION

Broadly, the present invention relates to a method of assembling an actuator having an internal moving member wherein a sensor is positioned internally with the actuator during actuator assembly. An exemplary actuator of this type is a hydraulic cylinder and piston.

In one aspect of the invention, the actuator is a cylinder and piston assembly and the sensor is of the type where a first portion, such as a flexible connector, connects to the piston, the sensor is positioned in the closed end of the cylinder. Prior to insertion, the first portion of the sensor is attached to the piston and the piston and sensor are inserted in the cylinder to the desired position. The sensor housing, or second portion, is secured to the cylinder via a second portion of the sensor. Advantageously, this assembly may be performed during the final stages of the actuator assembly without disrupting or altering the piston and cylinder manufacturing operations. That is, the initial stages of the construction of the cylinder is carried out in the conventional manner and the present invention comes into play during final assembly, when the piston rod assembly is interfitted into the cylinder tube assembly. At that point in the assembly procedure, the piston position sensor is attached to a portion of the piston, such as the distal piston face, and the sensor and piston are inserted into the cylinder during that final assembly.

In another aspect of the invention, a flexible mounting collar affixed to the top of the piston position sensor features a hexagonal, or other configured pocket, formed in the mounting collar. The flexible connector exits the top of the sensor in the center of the hexagonal pocket and the cable connector resembles a modified bolt, having a hexagonal head that is loosely fitted into and engaged by the hexagonal pocket formed in the top of the mounting collar. The hexagonal pocket feature makes the attachment of the sensor to a portion of the piston, e.g., the distal piston face, easier and more efficient as the threaded end of the attachment bolt can be engaged with the threaded receiving hole on the piston. Since the hexagonal head of the attachment bolt is secured to the hexagonal pocket on the mounting collar, the engagement of the attachment bolt with the threaded hole in the piston is accomplished by rotating the entire sensor. When the attachment bolt is substantially screwed in, the sensor can be withdrawn from the piston for a short distance to provide access to the attachment bolt, and final tightening can be accomplished.

In another aspect of the invention, the mounting collar can be attached to the distal face of the piston such that the piston position sensor is releasably affixed or attached to the distal face, that is, the face that initially enters the cylinder tube. The mounting collar is located on the outer surface of the sensor i.e. the surface that faces outwardly when in the inserted position. An internally shaped pocket is also formed on the distal face of the piston such that the mounting collar is adapted to releasably fit to the pocket in a manner that allows the fit to be later disengaged. One exemplary fit is a snap fit, but other releasable engagements can be used.

In another aspect, the mounting collar is formed as a substantially conical projection from the top of the sensor and is preferably formed of an elastomeric material and can be an integral feature of the sensor external packaging. The flexible property of the mounting collar allows the mounting collar to snap fit or otherwise engage into the cylindrical mounting pocket formed in the distal face of the piston. The mounting pocket in the distal face of the piston has annular groove around the periphery of its inner face and the mounting collar is provided with an annular ridge protruding from the outer periphery of the mounting collar and which engage with each other to releasably affix or attach the sensor to the piston.

Accordingly, after the connection of the flexible connector to the distal face of the piston has been completed, the mounting of the sensor onto the distal face of the piston is accomplished by pressing the mounting collar into the mounting pocket formed in the piston and twisting slightly until the collar snaps into the mounting pocket. The attachment is sufficient to hold the sensor to the piston during assembly of the hydraulic cylinder and is detachable after the final cylinder assembly is completed so that the piston can thereafter move independently of that portion of the sensor.

In another aspect of the invention, which is desirable for a sensor intended to have a particular angular orientation within an hydraulic cylinder, in the actual insertion of the piston rod assembly into the cylinder tube assembly, the angular alignment of the sensor is checked since certain asymmetrical features of the sensor, such as its mounting holes, should be in approximate alignment when the sensor reaches the closed end of the cylinder tube. The angular alignment relates to the angular orientation of the sensor features around the axis of the cylinder tube and that alignment is easily adjusted. The sensor collar forms a rotatable connection with the piston face and a fixture is provided to assure that the proper angular orientation is achieved before the sensor is inserted into the cylinder tube. One means of ensuring proper angular alignment of the sensor to the cylinder tube is to fix an optical beam on an assembly bench and fix the optical beam along a flat area of the sensor. Alternative methods could, of course, be used such as utilizing a gate having a flat surface that mates with a flat surface of the sensor to arrive at the correct angular orientation of the sensor with respect to the cylinder tube.

In yet another aspect, the piston rod assembly is pushed into the cylinder tube assembly by means of a push rod such the piston is pushed all the way back into the cylinder tube, thereby positioning the sensor in the desired position at the back, closed end of the cylinder tube. The sensor can be affixed in that location by means of two opposing installation bolts that are threaded from the outside of the cylinder tube through threaded holes in the cylinder tube, extending through the pressure wall and beveled engaging holes provided on each side of the sensor. The bolts are oriented perpendicular to the axis of travel of the piston and at the closed end of the cylinder tube in the sensor's operating location proximate that closed end. The engaging holes provided in the sensor are substantially opposite one another, and located to correspond with the threaded holes provided in the cylinder tube. The engaging holes provide a bevel around their open end so as to compensate for alignment errors during installation. Thus, by the beveled holes, as the bolts are secured to the holes, the bevel will steer the sensor into proper alignment and that alignment also applies to deviations in front-to-back placement of the sensor. More or less than two bolts can be used, or engagement mechanisms other than threaded engagement can be use without departing from the invention.

BRIEF DESCRIPTION OF THE DRAWINGS

A more complete understanding of the invention may be obtained from consideration of the following description in conjunction with the drawings in which.

DETAILED DESCRIPTION

Figure 1A:
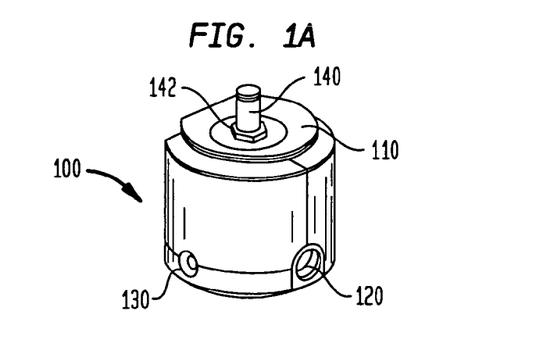
FIG. 1A is a perspective view of an exemplary sensor according to the principles of the invention.
Figure 1B:
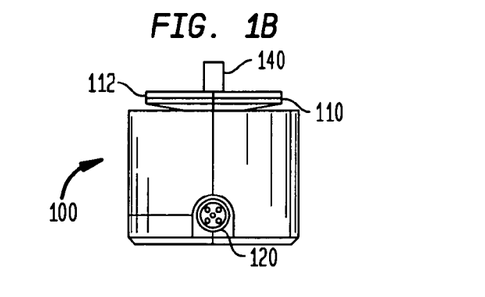
FIG. 1B shows a front view of the sensor of FIG. 1A.
Figure 3:
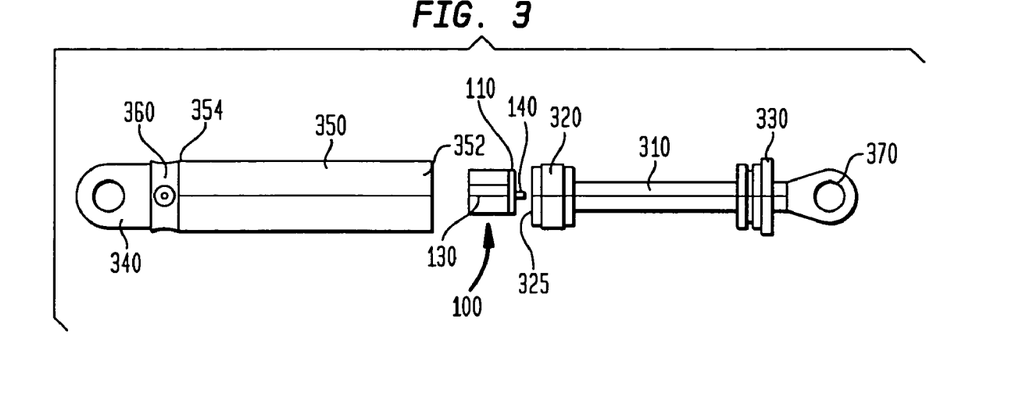
FIG. 3 shows an exploded view of an exemplary cylinder and sensor according to the principles of the invention.

FIGS. 1A and 1B respectively show a perspective view and a front view of a sensor 100 and a securing device, such as a threaded connector 140, constructed in accordance with the present invention. As can be seen, the sensor includes mounting collar 110 that facilitates attachment to a cylinder piston 320 (FIG. 3). A threaded connector 140 extends outwardly from the center of the sensor 100 is provided for attachment of the flexible connector cable to the piston. The threaded connector 140 sits within a suitably shaped pocket formed in the mounting collar 110 that conforms to the shape of the head 142 of the threaded connector 140. For example, if the head 142 of the threaded connector 140 is a hexagonal head, there is a hexagonal shaped pocket formed in the mounting collar 110 such that the threaded connector 140 can loosely fit within that pocket.

The are also two beveled holes 130 (only one of which is shown in FIG. 1A) that provide a means for affixing the sensor 100 after installation and insertion into a cylinder as will be explained. A multi-pin electrical connection 120 provides signal connections. As can be seen more clearly in FIG. 1B, the mounting collar 110 has a flattened conical shape. The mounting collar 110 is preferably formed from an elastomeric material and is capable of bending or flattening. The mounting collar 110 also comprises a ridge 112 around its periphery. The ridge 112 acts as a barb to provide a snap-fit during sensor installation. Other fits can be used as well as other engagement means. What is important is that the sensor body attach to the piston and detach from the piston.

Figure 2:
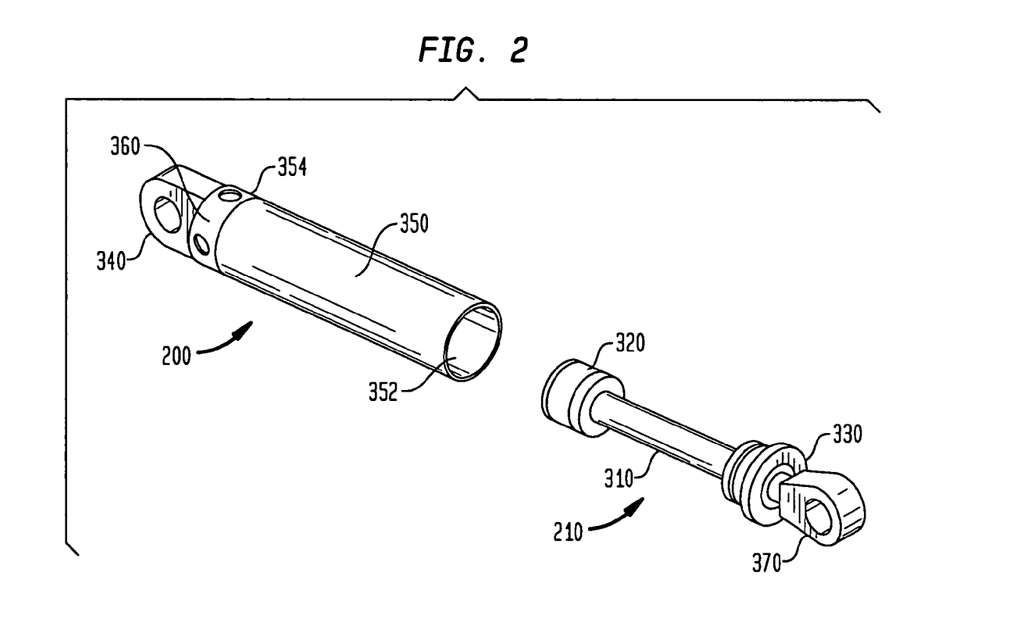
FIG. 2 shows an exploded view of an exemplary cylinder according to the principles of the invention.

Turning now to FIG. 2, there is shown an exploded view of a hydraulic cylinder prior to final assembly. It may be seen that there are two major sub-assemblies. The cylinder tube assembly 200 consists of the back clevis 340, an end cap 360, and a cylinder tube 350 that has an open end 352 and a closed end 354. The piston rod assembly 210 consists of a piston 320, a piston rod 310, a head 330, and a rod clevis 370. A method of assembly is to secure the cylinder tube assembly 200 on a workbench, and insert the piston rod assembly 210 into the open end 352 of the cylinder tube 350. The head 330 is then attached to the cylinder tube 350 by threading or bolting, in some cases by the employment of an intermediate flange. In some instances, the head 330 is held stationary while the cylinder tube assembly 200 is rotated about its axis, thus screwing the cylinder tube 350 and the head 330 together.

Turning now to FIG. 3, there is shown an exploded view of a hydraulic cylinder with the various components positioned just prior to assembly. In this view the sensor 100 of the present invention is shown in a position to be installed onto the distal face 325 of the piston 320. As can be seen, the sensor 100 is in position to be mounted to the distal face 325 of the piston 320 and the mounting collar 110 faces that distal face 325 and the threaded connector 140 extends outwardly from the mounting collar 110 toward the distal face 325 of the piston 320.

Figure 4:
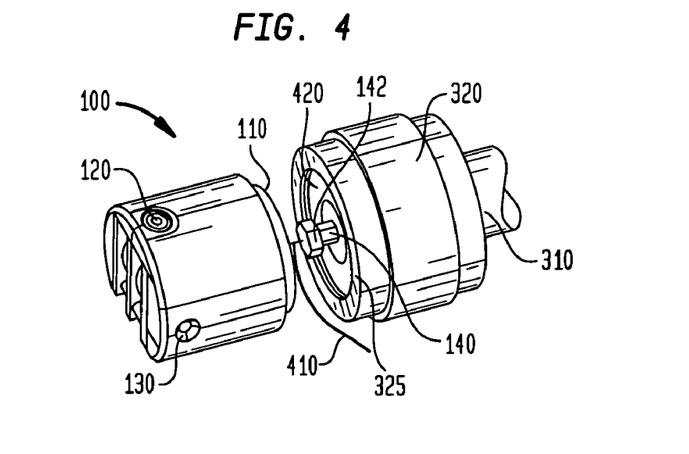
FIG. 4 shows a perspective of an exemplary sensor and connecting means according to the principles of the invention.

Turning now to FIG. 4, there is shown a perspective view of the piston 320 with the sensor 100 in position to be affixed thereto in an intermediate step of installation onto the piston 320. The threaded connector 140 is threaded into a hole in the distal face 325 of the piston 320. As explained, the threaded connector 140 can be initially started into the threaded hole in the distal face 325 of the piston 320 by rotating the entire sensor 100 since the head 142 of the threaded connector 140 is loosely fitted within the pocket formed in the mounting collar 110. Once the threading has been started, however, the sensor 100 can be withdrawn and the remaining threading can be accomplished with a wrench, as in the FIG. 4 position. Affixed to the threaded connector 140 is a flexible connector 410 that extends into the sensor 100 in the use of the sensor 100 to determine the position of the piston 320 within the cylinder tube 350 (FIG. 3) in the manner described in the aforementioned patent and co-pending patent applications.

In one aspect, the attachment bolt can be hollow, and the flexible connector can be connected to the attachment bolt by means of a ball. This will permit the bolt to rotate about the connector without twisting the connector. Such an arrangement is disclosed in a provisional U.S. Provisional Patent Application Ser. No. 60/364,711 entitled "Method and Apparatus for Connecting Cables", which is hereby incorporated by reference.

A receiving pocket 420 is formed in the distal face 325 of the piston 320. After tightening the threaded connector 140 into the distal face 325 of the piston 320, the mounting collar 110 can be snapped into the receiving pocket 420 so that the sensor 100 is secured to the distal face 325 of the piston 320. In this way the sensor 100 is attached to the piston rod assembly 210, prior to the final assembly of the hydraulic cylinder in a connection that can later be disconnected in the further steps in carrying out the present invention.

Figure 5:
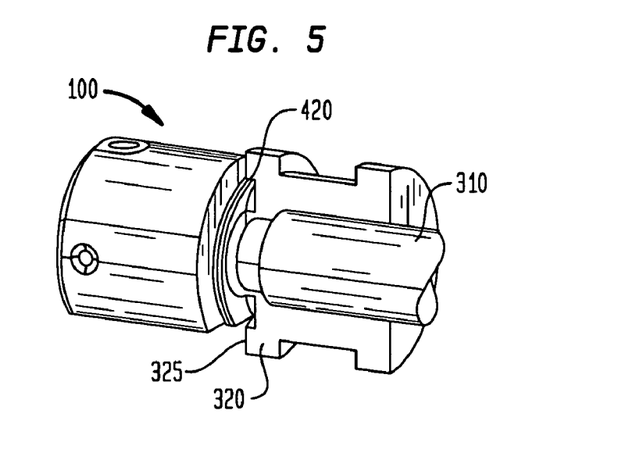
FIG. 5 shows a cutaway perspective of an exemplary sensor pre-installation according to the principles of the invention.

In FIG. 5, there can be seen a cutaway view showing the actual connection between the sensor 100 and the piston 320. As can be seen, the mounting collar 110 is shown interfitting into the receiving pocket 420 such that the sensor 100 is removably affixed to the piston 320 in a manner that can later be disconnected. Due to the flexibility of the mounting collar 110 the affixation of the mounting collar 110 to the distal face 325 of the piston 320 is sufficient to insert the sensor 110 into the cylinder tube 350 (FIG. 3) but, as will be seen, that junction can be disconnected in accordance with the further steps of the present invention.

Figure 6:
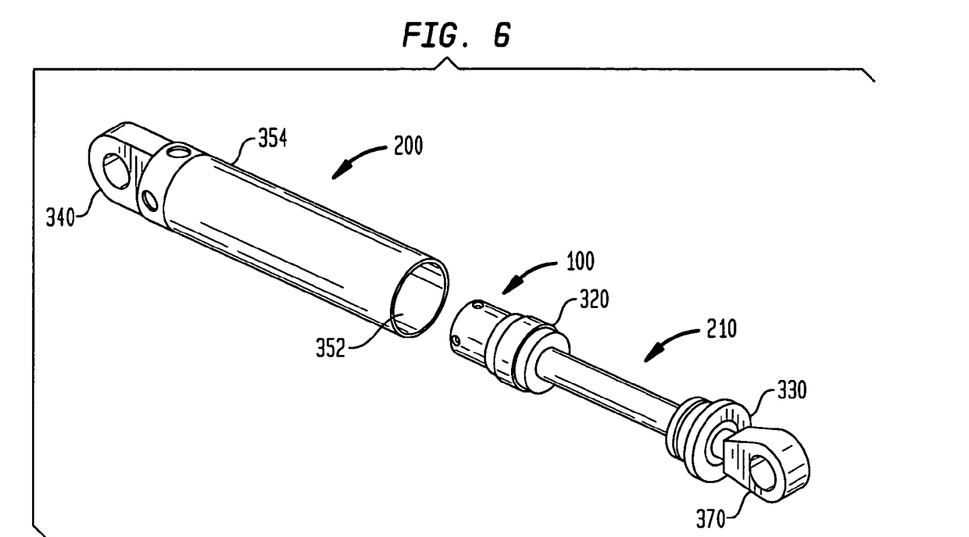
FIG. 6 shows an exploded perspective of an exemplary cylinder and sensor according to the principles of the invention.

Turning now to FIG. 6, there is shown an exploded view showing the piston rod assembly 210, with the sensor 100 installed, with the piston rod assembly 210 in position to be inserted into the open end 352 of the cylinder tube assembly 200. This is the position of the major sub assemblies just prior to final assembly of the complete hydraulic cylinder with a sensor 100. At this point a pusher is used to push the piston rod assembly 210 and sensor 100 is inserted into the cylinder tube assembly 200.

Figure 7A:
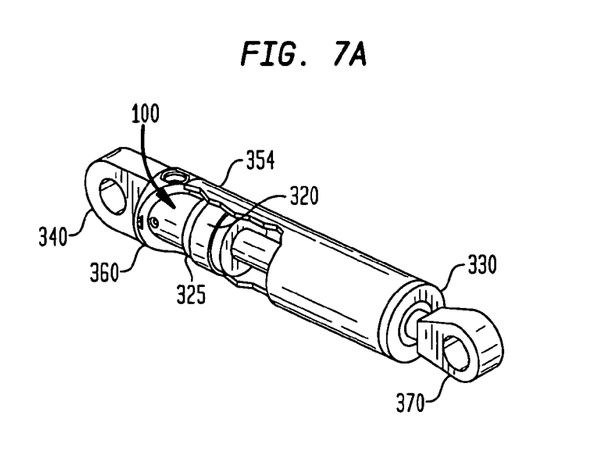
FIG. 7A shows a cutaway perspective of an exemplary cylinder and sensor according to the principles of the invention.

Next, in FIG. 7A, there is shown a perspective view, partially cutaway, of the complete hydraulic cylinder assembly 700 with sensor 100. The sensor 100 is located at the closed end 354 of the end cap 360 proximate to the closed end 354 of the cylinder tube assembly 200 having been pushed fully into the cylinder tube assembly 200 and is generally located in its operative position but is still attached to distal face 325 of the piston 320. The piston 320 is driven all the way to the back of the cylinder tube assembly 200, thus inserting the sensor 100 into the space provided in the end cap 360.

Figure 7B:
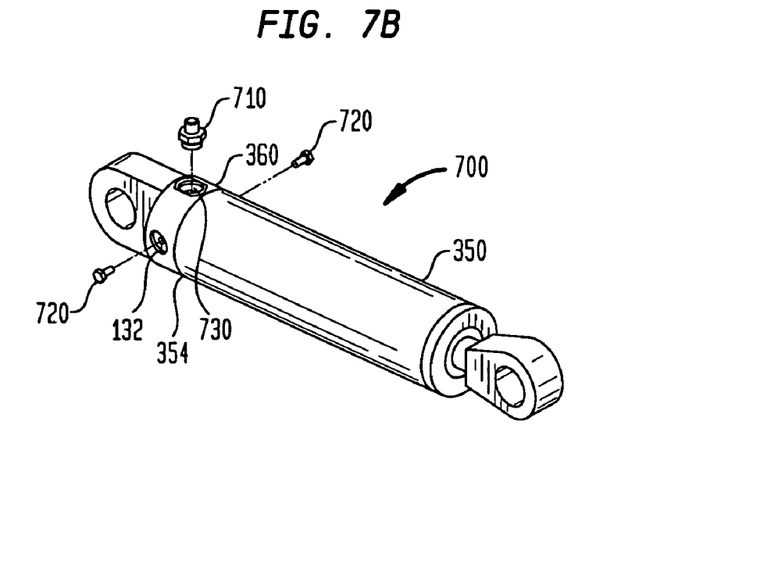
FIG. 7B shows a perspective of an exemplary cylinder and sensor mounting hardware according to the principles of the invention.

In FIG. 7B, there is shown a perspective view of assembled hydraulic cylinder 700 and showing the attaching bolts 720 and the high-pressure connector bushing 710 that are used in completing the hydraulic cylinder assembly with sensor 100 (FIG. 7A). The attaching bolts 720 thread into opposing beveled holes 130 (FIG. 4) in the end cap 360. The ends of the attaching bolts 720 engage the beveled holes 130 (FIG. 4) on opposing sides of the sensor 100. In this manner, the sensor 100 is secured into the end cap 360 proximate the closed end 354 of the cylinder tube 350. As explained, the beveled holes 130 are beveled so that as the attaching bolts are screwed into the threaded holes 132 in the end cap 360, the sensor 100 is aligned by the tightening of those attaching bolts 720 and they move the sensor 100 to the proper, desired aligned location with the cylinder tube 350. The high-pressure connector bushing 710, along with a high-pressure electrical connector, is threaded into a standard port 730 in the end cap 360. The high-pressure connector bushing 710 retains a high-pressure electrical connector that serves to take signals into and out of the high-pressure environment in the hydraulic cylinder. As noted, the high pressure connector bushing 710 utilizes a standard port 730 that is present in conventional hydraulic cylinders and therefore the potential expense of forming a special port for the high pressure connector bushing 710 is saved.

Once the sensor 100 has been fully secured within the closed end 354 of the cylinder tube 350, the piston 320 can be moved away from the sensor 100 to detach itself from the sensor 100 so that thereafter the piston 320 can move freely and independent of the sensor 100 that is now in a secured position in its operative location so that the hydraulic cylinder can operate in its normal manner.

Figure 8:
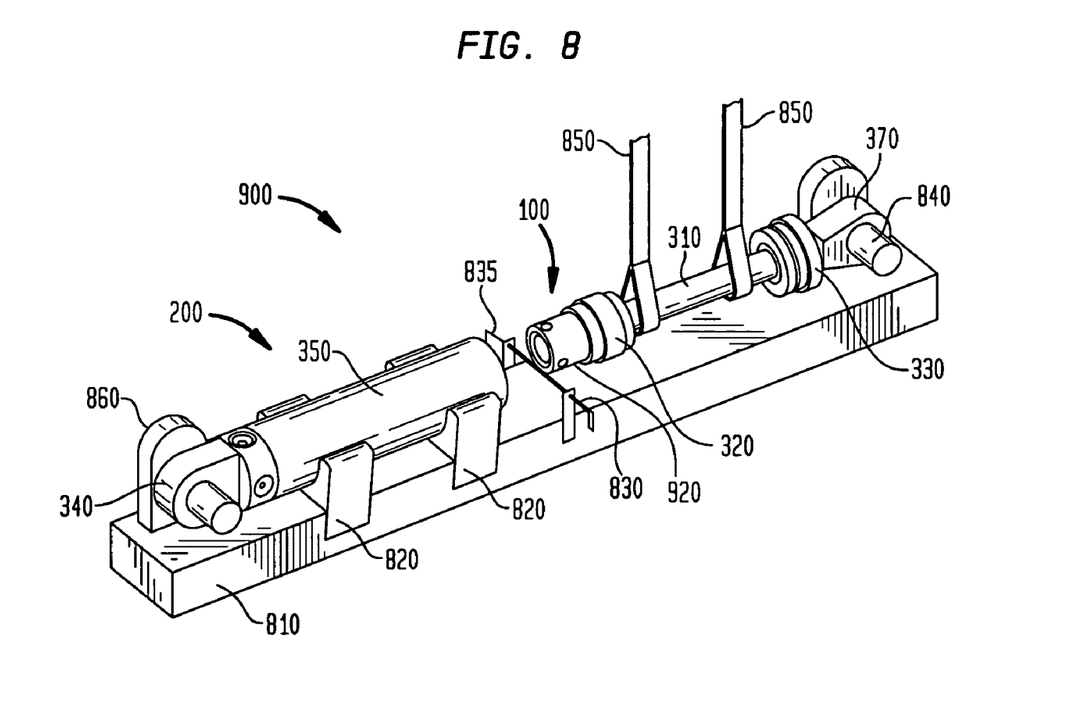
FIG. 8 shows a perspective of an exemplary assembly system, according to the principles of the invention.

Turning now to FIG. 8, there is shown an assembly system or fixture 900 for the assembly of a hydraulic cylinder in accordance with the present invention. A base 810 provides supports 820 for the cylinder tube 350 to maintain the cylinder tube 350 in a fixed position as the hydraulic cylinder is assembled. A clevis pin 860 is located at one end of the base 810 and passes through the back clevis 340 to secure the cylinder tube assembly 200 to the base 810. The piston rod assembly 210 is supported by straps 850 that are attached to a lift assist. A moveable clevis pin 840 fitted into the rod clevis 370 is used to push the piston rod assembly 210 into the cylinder tube assembly 200. As can be seen, the sensor 100 is attached to the piston 320 such that the insertion of the piston rod assembly 210 results in the installation of the sensor 100 as described in previous figures.

It is also desirable that the sensor 100 be properly aligned for insertion into the cylinder tube 350 in order to locate various physical features or components, including mounting and signal connection features of the sensor 100 in the proper aligned orientation when inserted into its operative position within the cylinder tube 350, including the alignment of the beveled holes 130 (FIG. 7). Accordingly, the geometry of the sensor 100 itself is such that the exterior peripheral surface is generally cylindrical, thereby having a generally circular cross section, but there is also formed a flat face 920 formed on that outer peripheral surface. That flat face 920 is thereby used to carry out the angular alignment of the sensor 100 and as preferred, however, it will be seen that other special shaped or characteristics of the sensor 100 can be used to achieve the proper angular alignment. Accordingly, in FIG. 8, there is shown one sensing means used to detect the angular location of that flat face 920 and the sensing means comprises a light emitter 830 and a light detector 835.

Thus, the light beam from the light emitter 830 will be blocked by the circular outer peripheral surface of the sensor 100, however as the sensor 100 is rotated with respect to piston 320, there will be a point in its angular orientation where the light beam from the light emitter 830 passes along the flat face 920 where the outer peripheral surface is inset as opposed to the normal circular periphery and the light beam from the light emitter 830 will reach the light detector 835. As such, when the light detector 835 senses the light beam, the system recognizes that the sensor 100 is in the proper orientation for insertion into the cylinder tube assembly 200 and a pusher can, at that time push the piston rod assembly 210 into the cylinder tube assembly 200. The use of the light emitter 830 and detector 835 can easily be employed to provide a visual or audible signal to the effect that the sensor 100 is in the proper angular orientation.

Figure 9:
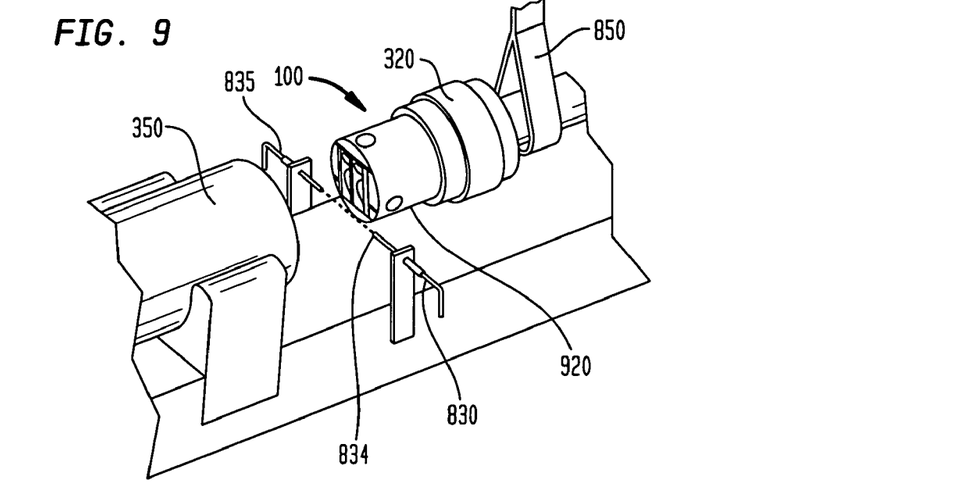
FIG. 9 shows a detail perspective of an exemplary assembly system, according to the principles of the invention.
Figure 10:
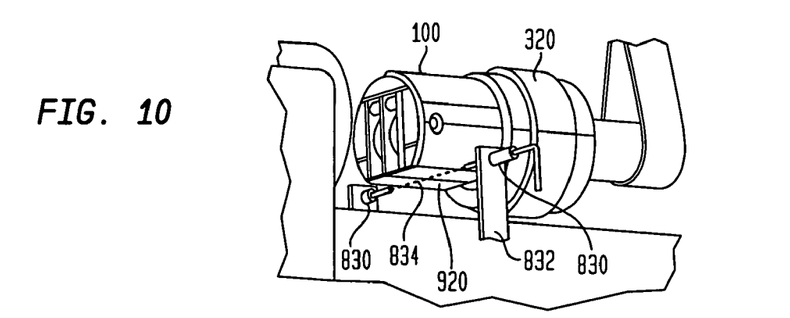
FIG. 10 shows another detail perspective of an exemplary assembly system, according to the principles of the invention.

Turning now to FIGS. 9 and 10, there can be seen upper and lower perspective views of the use of the light emitter 830 and light detector 835 as described with respect to FIG. 8. Thus, as can be seen in FIGS. 9 and 10, the light emitter 830 provides a beam of light 834 directed at the light detector 835 such that the beam of light 834 passes by the flat face 920 of sensor 100. Since the proper alignment of the flat face 920 is the only position of the sensor 100 that will cause the light beam to actually reach the light detector 835, when the light is detected by the light detector 835 and a corresponding signal generated, the sensor 100 is in the proper angular orientation.

Figure 11:
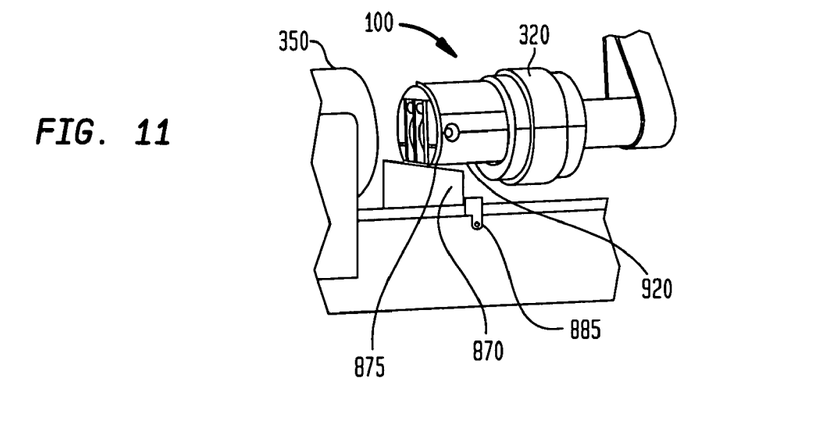
FIG. 11 shows a detail perspective of an another assembly system according to the principles of the invention.

Turning to FIG. 11, there is shown an alternative sensing means to assure the proper angular alignment of the sensor 100 for insertion into the cylinder tube assembly 200. In FIG. 11 there is used a mechanical guide 870 that is used and which has a flat upper surface 875 that must be in alignment and basically abut the flat face 920 of the sensor 100 in order for the sensor 100 to be advanced toward the cylinder tube assembly 200. Thus, the mechanical guide 870 will only allow the advancement of the sensor 100 if the flat face 920 is properly aligned so that the sensor 100 is in the proper angular orientation to be inserted into the cylinder tube 350. The mechanical guide 870 is pivotally affixed to the base 810 by means of a hinge 885 so that the mechanical guide 870 can be flipped down so as to be out of the way as the piston rod assembly 210 is inserted into the cylinder tube 350.

In addition or in combination with the above, the flat surface can be used to simply orient the sensor to a reference. For example, during pushing, the flat surface can be used as a sight reference to maintain the sensor substantially in some orientation, such as maintaining the surface substantially horizontal. In this manner, the sensor is inserted such that it is approximately aligned for securing.

Figure 12:
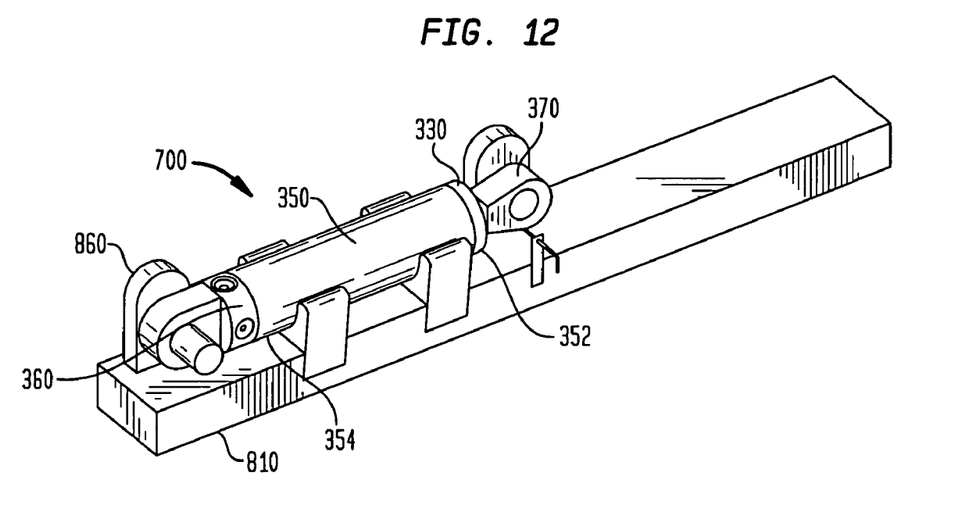
FIG. 12 shows another perspective of an exemplary assembly system, according to the principles of the invention.

In FIG. 12 there is shown the completed assembly with the piston rod assembly 210 (FIG. 2) having been inserted all the way into the cylinder tube assembly 200. The head 330 is fastened to the open end 352 of the cylinder tube 350 by means of a threaded engagement or by means of bolts (not shown) that pass through the head 330 and threaded into holes provided in the cylinder tube 350 or a flange affixed to the cylinder tube 350. The complete hydraulic cylinder assembly with a piston position sensor is therefore ready for the installation of sensor mounting hardware as described in FIG. 7B.

Figure 13:
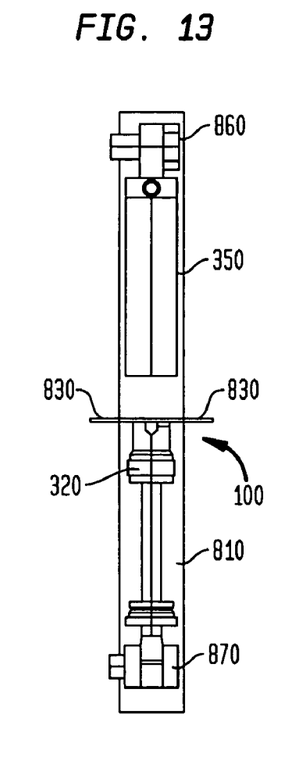
FIG. 13 shows a view of another assembly system, according to the principles of the invention.

Turning to FIG. 13, there is shown a side view of an alternate means of assembly in which the piston rod assembly 210 and the cylinder tube assembly 200 are both clamped in a vertical position rather than in a horizontal position as shown in FIGS. 11 and 12. In this alternate embodiment, when the final assembly is ready, the cylinder tube assembly 200 is lowered onto the piston rod assembly 210 vertically downwardly. The sensor alignment is accomplished as in previous figures.

It is to be understood that the invention is not limited to the illustrated and described forms of the invention contained herein. It will be apparent to those skilled it the art that various changes may be made without departing for the scope of the invention and the invention is not considered limited to what is shown in the drawings and described in the specification.

First, for example, while the present invention has been disclosed with respect to a cylinder and included piston, the present invention is applicable to other actuators having a movable member disposed with a fixed member and wherein a portion of the sensor is attached to the movable member and which tracks movement of this member so that the sensor provides an indication of the position of the movable member relative to the fixed member.

Second, the shape of the fixed and movable members need not be circular as in the disclosed cylinder and piston, but each of these members may have virtually any shape. Second while the disclosed cylinder and piston is oftentimes an hydraulic cylinder, the term "hydraulics" referring to any of a number of fluids, i.e., one or more liquids, one or more gases or a combination of the two, the mechanism for applying force to the movable member is virtually unconstrained. Furthermore, it is recognized that a spring for example can be used to apply force to the movable member. Accordingly, for purposes of this disclosure, the term actuator shall include hydraulic cylinders and other devices having internally moving members which are moved by a variety of force imparting mechanisms, including fluids and or other arrangements.

Third, while threaded engagements are shown for attaching the flexible connector to the piston and the sensor to the cylinder, other engagements can be used without departing from the invention.

Fourth, while the exemplary embodiments demonstrate insertion of a sensor into a cylinder, other objects can also be inserted without departing from the method of the invention.

What is claimed is:

1. A method of assembly comprising the steps of:
   attaching a sensor to a face of a piston;
   inserting the piston into a cylinder through an open end of the cylinder to position the sensor at a predetermined position;
   securing the sensor within the cylinder at the predetermined position; and
   detaching at least a portion of the sensor from the face of the piston;
   wherein the piston comprises a pocket on the face and the sensor comprises a flexible mounting collar, the attaching step including fitting the flexible mounting collar into the pocket.

2. A method of assembly comprising the steps of:
   attaching a sensor to a face of a piston;
   inserting the piston into a cylinder through an open end of the cylinder to position the sensor at a predetermined position;
   securing the sensor within the cylinder at the predetermined position; and
   detaching at least a portion of the sensor from the face of the piston;
   wherein the sensor comprises a flexible connector extending therefrom, the step of attaching the sensor to the face including securing the flexible connector to the face of the piston.

3. The method as in claim 2 wherein the detaching step includes retaining the flexible connector connected to the face of the piston.

4. The method as in claim 2 wherein the step of securing the flexible connector to the face comprises providing a securing device affixed to the free end of the flexible connector to secure the flexible connector to the face of the piston.

5. The method as in claim 4 wherein the securing device comprises a threaded fastener and the step of securing the flexible connector to the face comprises screwing the threaded fastener into a corresponding threaded opening in the face of the piston.

6. The method as in claim 5 wherein the piston comprises a pocket on the face, the threaded fastener includes a head, and the sensor comprises a flexible mounting collar having a pocket formed therein to interfit with the head of the threaded fastener, the screwing step including rotating the sensor while the head is interfit to the mounting collar and the attaching step including fitting the flexible mounting collar into the pocket in the face of the piston.

7. A method of assembly comprising the steps of:
   attaching a sensor to a face of a piston;
   inserting the piston into a cylinder through an open end of the cylinder to position the sensor at a predetermined position;
   securing the sensor within the cylinder at the predetermined position; and
   detaching at least a portion of the sensor from the face of the piston;
   wherein the sensor comprises an outer peripheral surface and a portion of which is comprised of a flat surface, and wherein the step of inserting comprises aligning the piston with respect to the cylinder by sensing when the location of the flat surface of the sensor is in a predetermined position with respect to the cylinder.

8. The method of claim 7 wherein the step of sensing the location of the flat surface comprises directing light along the flat surface and detecting the light when the flat surface is properly aligned.

9. The method of claim 7 wherein the step of sensing the location of the flat surface comprises providing another flat surface that abuts the flat surface when the flat surface is properly aligned.

10. The method of claim 7 wherein the sensing step comprises sighting along the flat surface.

11. A method of assembly comprising the steps of:
    attaching a sensor to a face of a piston;
    inserting the piston into a cylinder through an open end of the cylinder to position the sensor at a predetermined position;
    securing the sensor within the cylinder at the predetermined position; and
    detaching at least a portion of the sensor from the face of the piston;
    wherein the cylinder is held in a position by a support; the piston is movably held by a second support such that the piston can be moved into a coaxial position relative to the cylinder; and an alignment guide is used to determine when the piston is rotatably aligned with the cylinder.

12. The method of claim 11 wherein the alignment guide comprises a light source and a light detector to determine when the piston is rotatably aligned with the cylinder.

13. The method of claim 11 wherein the alignment guide comprises a shaped surface adapted to abut a similarly shaped surface on the sensor.

14. The method of claim 13 wherein the shaped surface is a flat surface.

15. The method of claim 11 wherein the support for holding the cylinder and the second support for movably holding the piston have vertically oriented longitudinal axes.

16. A method of assembly comprising the steps of:
    attaching a sensor to a face of a piston;
    inserting the piston into a cylinder through an open end of the cylinder to position the sensor at a predetermined position;
    securing the sensor within the cylinder at the predetermined position; and
    detaching at least a portion of the sensor from the face of the piston;
    wherein in the inserting step, the sensor, having at least one beveled hole, into a cylinder tube, having at least one threaded hole proximate an end, is inserted to position the sensor proximate the end of the cylinder tube while generally aligning the at least one threaded hole in the cylinder tube with the at least one beveled hole.

17. The method of claim 16 wherein the cylinder tube comprises at least two threaded holes oppositely located with respect to each other.

18. The method of claim 16 wherein the step of inserting the sensor into the cylinder tube comprises attaching a first portion and a second portion of the sensor to a piston, the method comprising the further step of detaching one of the first portion or the second portion from the piston.

* * * * *